United States Patent
Guo et al.

(10) Patent No.: US 11,921,971 B2
(45) Date of Patent: Mar. 5, 2024

(54) LIVE BROADCASTING RECORDING EQUIPMENT, LIVE BROADCASTING RECORDING SYSTEM, AND LIVE BROADCASTING RECORDING METHOD

(71) Applicant: Optoma China Co., Ltd, Shanghai (CN)

(72) Inventors: Kai-Ming Guo, Shanghai (CN); Tian-Shen Wang, Shanghai (CN); Zi-Xiang Xiao, Shanghai (CN); Yi-Wei Lee, Shanghai (CN)

(73) Assignee: Optoma China Co., Ltd, Shanghai (CN)

( * ) Notice: Subject to any disclaimer, the term of this patent is extended or adjusted under 35 U.S.C. 154(b) by 0 days.

(21) Appl. No.: 17/717,134

(22) Filed: Apr. 11, 2022

(65) Prior Publication Data

US 2022/0334706 A1    Oct. 20, 2022

(30) Foreign Application Priority Data

Apr. 15, 2021   (CN) .......................... 202110405132.2

(51) Int. Cl.
*G06F 3/048* (2013.01)
*G06F 3/04815* (2022.01)
(Continued)

(52) U.S. Cl.
CPC ........ *G06F 3/04815* (2013.01); *G06F 3/0482* (2013.01); *G06F 3/04847* (2013.01); *G06T 19/006* (2013.01)

(58) Field of Classification Search
CPC .............. G06F 3/04815; G06F 3/0482; G06F 3/04847; G06T 19/006
See application file for complete search history.

(56) References Cited

U.S. PATENT DOCUMENTS 10,015,261 B2 *  7/2018  Hsieh .................... H04W 76/10
11,196,963 B1 *  12/2021  DiPasquale ........... H04L 65/403
(Continued)

FOREIGN PATENT DOCUMENTS

| CN | 103795785 | 5/2014 |
|---|---|---|
| CN | 106303160 | 1/2017 |

(Continued)

OTHER PUBLICATIONS

"Office Action of China Counterpart Application", dated Sep. 28, 2023, p. 1-p. 8.

*Primary Examiner* — Haoshian Shih
(74) *Attorney, Agent, or Firm* — JCIPRNET

(57) ABSTRACT

A live broadcasting recording equipment, a live broadcasting recording system and a live broadcasting recording method are provided. The live broadcasting recording equipment includes a camera, a processing device, and a terminal device. The camera captures images to provide photographic data. The processing device executes background removal processing on the photographic data to generate a person image. The terminal device communicates with the processing device and has a display. The processing device executes multi-layer processing to fuse the person image, a three-dimensional virtual reality background image, an augmented reality object image, and a presentation image, and generate a composite image. After an application gateway of the processing device recognizes a login operation of the terminal device, the processing device outputs the composite image to the terminal device, so that the display of the terminal device displays the composite image.

23 Claims, 8 Drawing Sheets

(51) Int. Cl.
*G06F 3/0482*     (2013.01)
*G06F 3/04847*    (2022.01)
*G06T 19/00*      (2011.01)

(56) References Cited

U.S. PATENT DOCUMENTS

| | | | | |
|---|---|---|---|---|
| 11,317,060 | B1* | 4/2022 | Libin | H04N 7/157 |
| 2013/0314421 | A1* | 11/2013 | Kim | G06T 19/00 |
| | | | | 345/427 |
| 2014/0223349 | A1* | 8/2014 | Shin | G06T 7/73 |
| | | | | 715/771 |
| 2018/0357802 | A1* | 12/2018 | Messmer | G06T 11/60 |
| 2020/0019295 | A1* | 1/2020 | Spivack | G06F 3/1454 |
| 2022/0191258 | A1* | 6/2022 | Sharp | H04N 7/15 |

FOREIGN PATENT DOCUMENTS

| | | |
|---|---|---|
| CN | 108389249 | 8/2018 |
| CN | 109920290 | 6/2019 |
| CN | 112204508 | 1/2021 |
| TW | 201901401 | 1/2019 |
| TW | 202015430 | 4/2020 |
| TW | M594767 | 5/2020 |

* cited by examiner

LIVE BROADCASTING RECORDING EQUIPMENT, LIVE BROADCASTING RECORDING SYSTEM, AND LIVE BROADCASTING RECORDING METHOD

CROSS-REFERENCE TO RELATED APPLICATION

This application claims the priority benefit of Chinese application serial no. 202110405132.2, filed on Apr. 15, 2021. The entirety of the above-mentioned patent application is hereby incorporated by reference herein and made a part of this specification.

BACKGROUND

Technical Field

The disclosure relates to an audio visual equipment and broadcasting method, in particular to a live broadcasting recording equipment, a live broadcasting recording system and a live broadcasting recording method.

Description of Related Art

With the increasing demand for remote video services such as remote teaching, video conferences, and online speeches, how to enrich the user experience of video operations is one of the main development directions in this field. However, general remote video services can only provide simple image capturing functions, such as capturing a user's speech while standing in front of a presentation, or capturing a real-time facial image of the user facing the camera, for example. In other words, general remote video services can only provide simple and boring video content to viewer equipment. In view of this, several embodiment solutions regarding how to provide diversified and favorable user experience video effects will be put forward below.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure provides a live broadcasting recording equipment, a live broadcasting recording system, and a live broadcasting recording method, capable of providing real-time, interactive, and immersive live images.

Other objectives, features, and advantages of the disclosure will be further understood from the further technological features disclosed by the embodiments of the disclosure.

In order to achieve one or part or all of the above objectives or other objectives, the live broadcasting recording equipment of the disclosure includes a camera, a processing device, and a terminal device. The camera is configured to capture images to provide photographic data. The processing device is coupled to the camera and is configured to execute background removal processing on the photographic data to generate a person image. The terminal device communicates with the processing device and has a display. The processing device executes multi-layer processing to fuse the person image, a three-dimensional virtual reality background image, an augmented reality object image, and a presentation image, and generate a composite image. After an application gateway of the processing device recognizes a login operation of the terminal device, the processing device outputs the composite image to the terminal device, so that the display of the terminal device displays the composite image.

In order to achieve one or part or all of the above objectives or other objectives, the live broadcasting recording system of the disclosure includes a live broadcasting recording equipment and a viewer equipment. The live broadcasting recording equipment includes a camera, a processing device, and a terminal device. The camera is configured to capture images to provide photographic data. The processing device is coupled to the camera and is configured to execute background removal processing on the photographic data to generate a person image. The terminal device communicates with the processing device and has a display. The viewer equipment communicates with the live broadcasting recording equipment. The processing device executes multi-layer processing to fuse the person image, a three-dimensional virtual reality background image, an augmented reality object image, and a presentation image, and generate a composite image. After an application gateway of the processing device recognizes a login operation of the terminal device, the processing device outputs the composite image to the terminal device, so that the display of the terminal device displays the composite image. The processing device provides the composite image to the viewer equipment for display.

In order to achieve one or part or all of the above objectives or other objectives, the live broadcasting recording method of the disclosure includes the following steps. Photographic data is provided by a camera of a live broadcasting recording equipment through capturing images. A person image is generated by the processing device of the live broadcasting recording equipment through executing background removal processing on the photographic data. Multi-layer processing is executed by the processing device to fuse the person image, a three-dimensional virtual reality background image, an augmented reality object image, and a presentation image, and a composite image is generated. Communication is performed with the processing device by the terminal device, and the composite image is output to the terminal device by the processing device after an application gateway of the processing device recognizes a login operation of the terminal device, so that the display of the terminal device displays the composite image. The composite image is provided to a viewer equipment by the processing device for display.

Based on the above, the live broadcasting recording equipment, the live broadcasting recording system, and the live broadcasting recording method may instantly fuse the person image, the three-dimensional virtual reality background image, the augmented reality object image, and the presentation image into the composite image, so that the viewer equipment may obtain real-time, interactive, and immersive live broadcasting images.

To make the aforementioned more comprehensible, several embodiments accompanied with drawings are described in detail as follows.

Other objectives, features, and advantages of the disclosure will be further understood from the further technological features disclosed by the embodiments of the disclosure wherein there are shown and described preferred of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
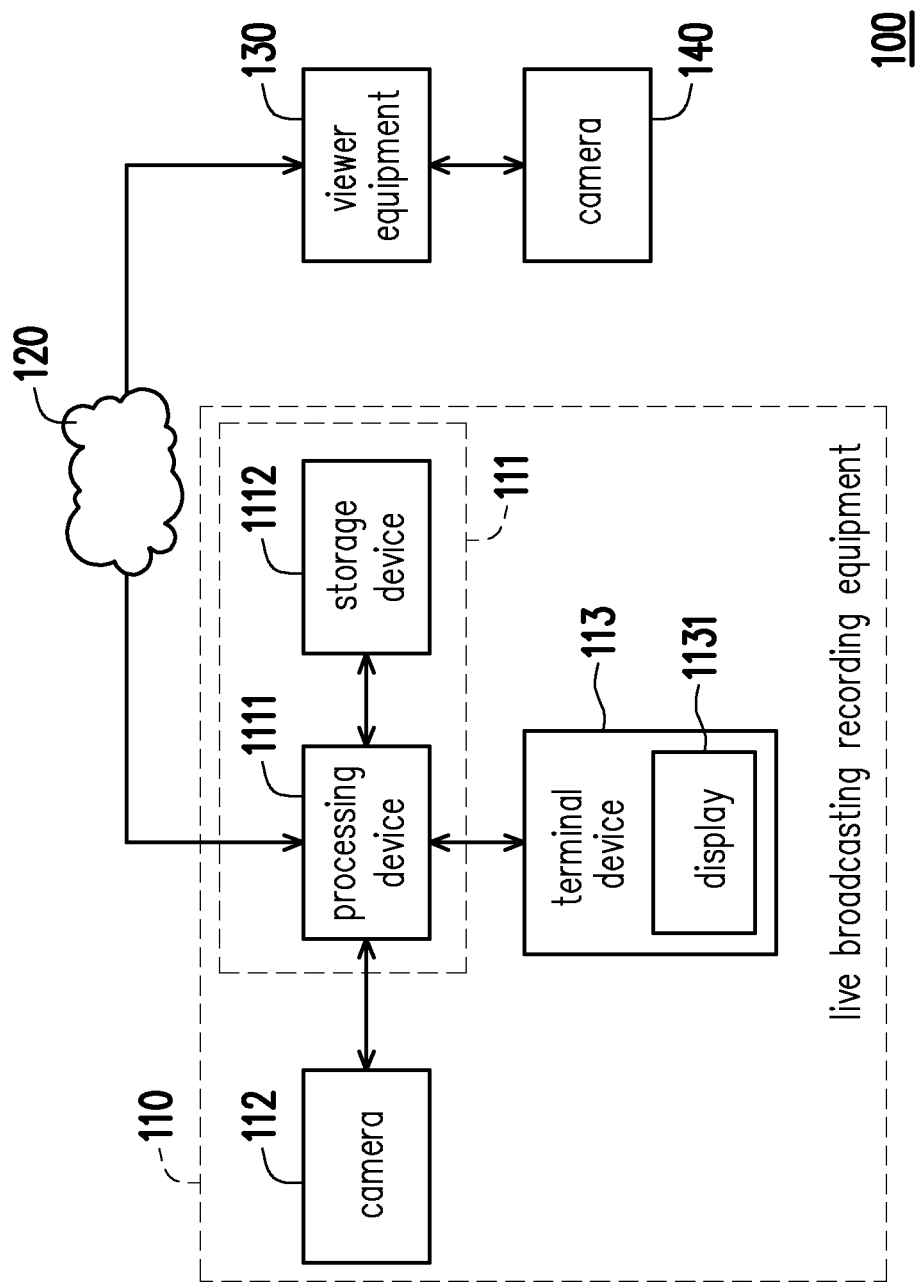
FIG. 1 is a schematic diagram of a circuit of a live broadcasting recording system according to an embodiment of the disclosure.

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "Coupled," and "mounted," and variations thereof herein are used broadly and encompass direct and indirect connections, couplings, and mountings.

The content of the disclosure and other technical content, features, and effects will be clearly presented in the following detailed description of a preferred embodiment with reference to the accompanying drawings. The directional terms mentioned in the following embodiment, such as: up, down, left, right, front, or back, etc., are only the directions with reference to the drawings. Therefore, the directional terms used are used to illustrate and not to limit the disclosure.

In order to make the content of the disclosure more comprehensible, embodiments in which the disclosure may be implemented are listed as follows. In addition, wherever possible, elements/components/steps with the same reference numerals in the drawings and embodiments represent the same or similar components.

FIG. 1 is a schematic diagram of a circuit of a live broadcasting recording system according to an embodiment of the disclosure. Referring to FIG. 1, a live broadcasting recording system 100 includes a live broadcasting recording equipment 110, a cloud equipment 120, a viewer equipment 130, and a viewer camera 140. The live broadcasting recording equipment 110 includes a processing host 111, a camera 112, and a terminal device 113. The processing host 111 includes a processing device 1111 and a storage device 1112. The terminal device 113 includes a display 1131. The processing device 1111 is coupled (electrically connected) to the camera 112, the terminal device 113, and the storage device 1112. The processing device 1111 may also perform wired or wireless communication with the cloud equipment 120 by a communication interface (not shown), and may perform wired or wireless communication with the viewer equipment 130 by the cloud equipment 120. The viewer equipment 130 is coupled to the viewer camera 140. The viewer camera 140 has the same function of the camera 112. The camera 112 and the viewer camera 140 may be a web camera, digital video camcorder or a camcorder, etc. According to this embodiment, the live broadcasting recording equipment 110 may upload a composite image to the cloud equipment 120, and provide the composite image to the viewer equipment 130 by the cloud equipment 120. The viewer equipment 130 may upload a viewer image obtained by the viewer camera to the cloud equipment 120, and provide the viewer image to the live broadcasting recording equipment 110 by the cloud equipment 120, and the viewer image is displayed on the display 1131 of the terminal device 113. According to some embodiments of the disclosure, the cloud equipment 120 may provide the composite image to multiple viewer equipment, and the cloud equipment 120 may provide multiple viewer images to the live broadcasting recording equipment 110.

According to this embodiment, the processing host 111 may be, for example, a desktop computer, a personal computer (PC), or a tablet PC, etc., and the processing host 111 is a device with image synthesis function, and is not particularly limited in the disclosure. The processing device 1111 may include a central processing unit (CPU) with image data processing and computing functions, or other programmable general-purpose or special-purpose microprocessor, digital signal processor (DSP), image processing unit (IPU), graphics processing unit (GPU), programmable controller, application specific integrated circuits (ASIC), programmable logic device (PLD), other similar processing devices or a combination thereof.

According to this embodiment, the storage device 1112 may store multiple programs and algorithms to perform image processing and live broadcasting recording operations according to embodiments of the disclosure. The programs may include, for example, a presentation program, an augmented reality (AR) program, a virtual reality (VR) program, a system setting program, a background execution program, a video playback program, a video conference program, and relevant image data, modules, and file data according to embodiments of the disclosure, but the disclosure is not limited thereto. The processing device 1111 may access and execute the relevant programs and data of the storage device 1112 to realize live broadcasting recording function according to the embodiments of the disclosure.

According to this embodiment, the terminal device 113 may be, for example, a smartphone, a tablet PC, or other portable devices, having the display 1131. The terminal device 113 may communicate with the processing host 111 in wired or wireless manner to transmit and receive image data and control commands, etc. According to this embodiment, the viewer equipment 130 may be, for example, a desktop computer, a personal computer, a smartphone or a tablet PC, having a display. The viewer equipment 130 and the processing device 1111 may execute an interactive video conference program for conference communication. The viewer equipment 130 may also upload the viewer image to the cloud equipment 120, and then transfer the viewer image to the terminal device 113 of the live broadcasting recording equipment 110, so that the terminal device 113 may provide a real-time viewer image to realize video conference interactive function.

Figure 2:
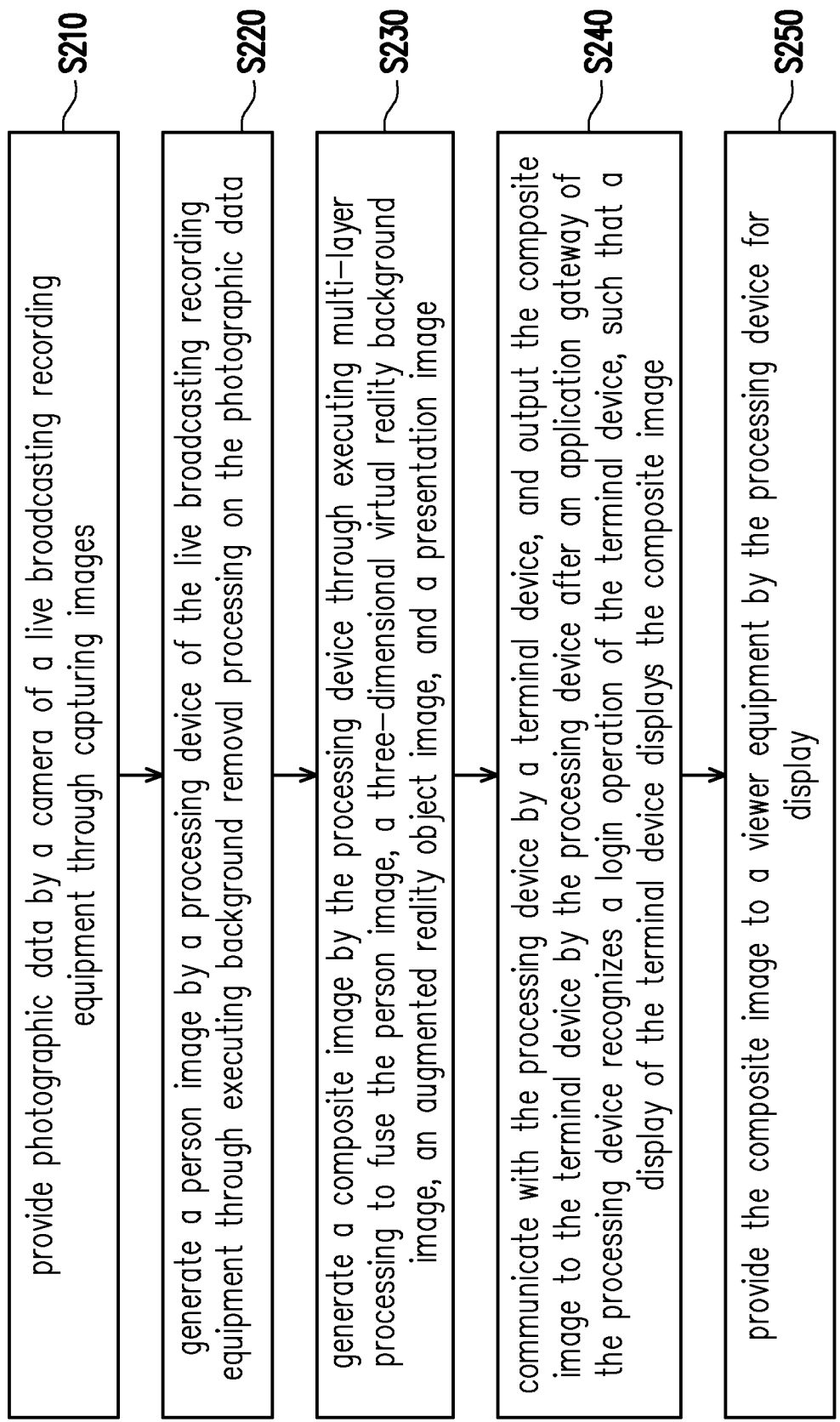
FIG. 2 is a flow chart of a live broadcasting recording method according to an embodiment of the disclosure.
Figure 3:
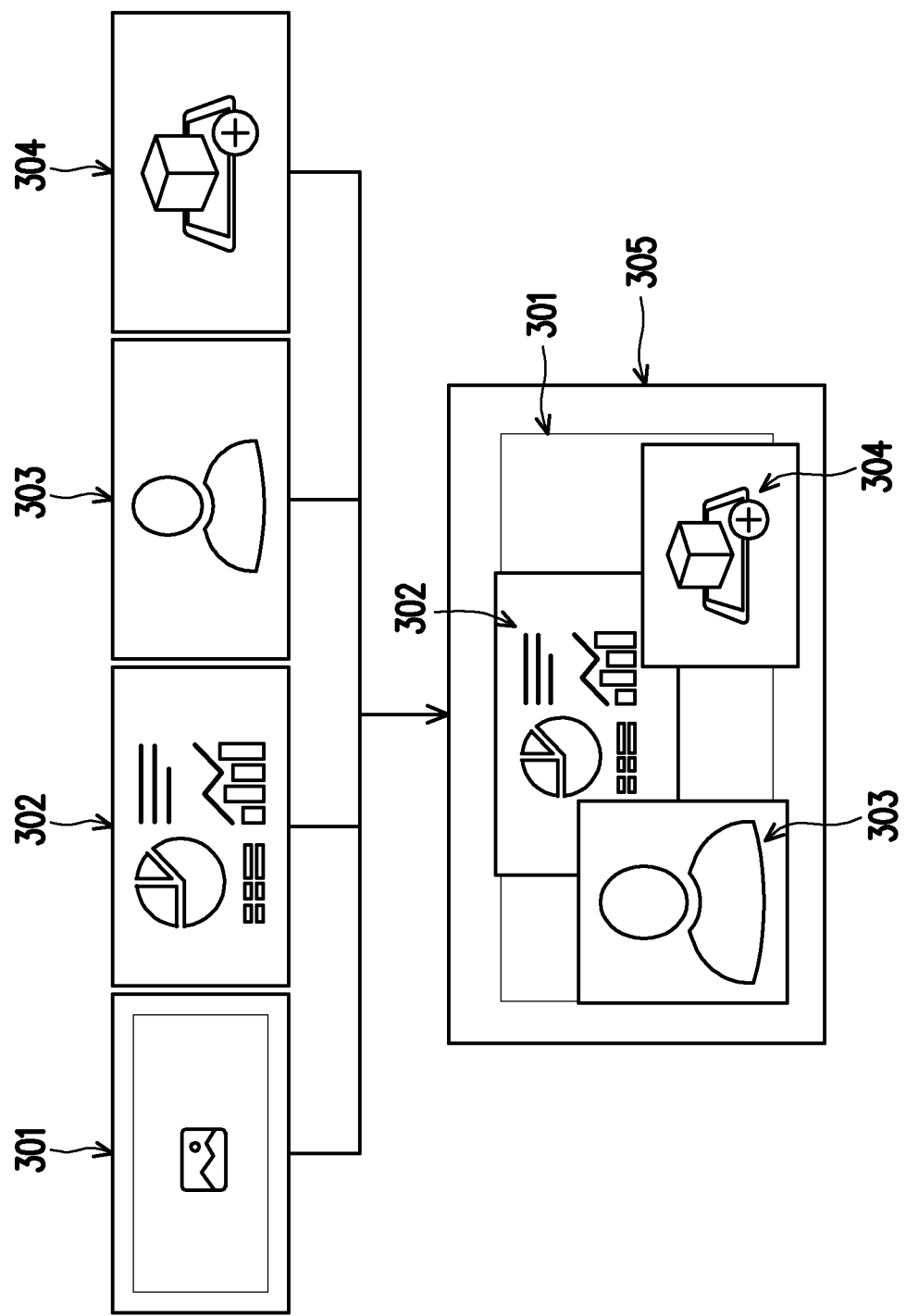
FIG. 3 is a schematic diagram of a composite image according to an embodiment of the disclosure.

FIG. 2 is a flow chart of a live broadcasting recording method according to an embodiment of the disclosure. FIG. 3 is a schematic diagram of a composite image according to an embodiment of the disclosure. Referring to FIG. 1 to FIG. 3, the live broadcasting recording system 100 and the live broadcasting recording equipment 110 according to this embodiment may execute the following steps S210 to S250 of the live broadcasting recording method. When the live broadcasting recording system 100 executes a live recording operation, in step S210, the camera 112 of the live broadcasting recording system 100 may capture images (photograph images of the user) to provide photographic data. The photographic data are corresponding to images captured by the camera. According to this embodiment, the user may, for example, stand in front of a specific screen (such as a green screen) to give lectures or teaching. The live broadcasting recording equipment 110 may also include a microphone to receive real-time audio from the user by the microphone. In step S220, the processing device 1111 of the live broadcasting recording equipment 110 may execute background removal processing on the photographic data to generate a person image 303. According to this embodiment, continuous images of the photographic data provided by the camera 112 may include, for example, image information of a person portion and a background portion. The processing device 1111 may execute an image processing program to instantly remove the background portion from the photographic data provided by the camera 112 and retain only the person image 303.

In step S230, the processing device 1111 may execute multi-layer processing to fuse the person image 303, a three-dimensional virtual reality background image 301, an augmented reality object image 304, and a presentation image 302, and generate a composite image 305. According to this embodiment, the processing device 1111 may execute the virtual reality program, the augmented reality program, and the presentation program (such as a PowerPoint presentation program) to generate the three-dimensional virtual reality background image 301, the augmented reality object image 304, and the presentation image 302. In addition, the processing device 1111 may execute the multi-layer processing to fuse the person image 303, the three-dimensional virtual reality background image 301, the augmented reality object image 304, and the presentation image 302 to generate the composite image 305 as shown in FIG. 3.

In step S240, the terminal device 113 may communicate with the processing device 1111, and after an application gateway of the processing device 1111 recognizes a login operation of the terminal device 113, the processing device 1111 may output the composite image 305 to the terminal device 113, so that the display 1131 of the terminal device 113 may display the composite image 305. According to this embodiment, the user may, for example, hold the terminal device 113 in hand, so that during live broadcasting recording process, current image content of the composite image 305 may be monitored, and the image content of the composite image 305 may be adjusted in real time. In step S250, the processing device 1111 may provide the composite image 305 to the viewer equipment 130 for display. According to this embodiment, the processing device 1111 and the viewer equipment 130 may, for example, execute the video conference program to conduct a video conference. In addition, the processing device 1111 may provide the composite image 305 to the viewer equipment 130, so that real-time, interactive, and immersive live broadcasting images may be viewed on the viewer equipment 130.

In addition, according to some embodiments of the disclosure, the viewer equipment 130 may obtain a real-time viewer image by the viewer camera 140. The viewer equipment 130 may return the viewer image to the processing device 1111, so that the display 1131 of the terminal device 113 may display the viewer image. In this way, the live broadcasting recording system 100 may provide the video conference function with real-time interactive effects. It should be noted that in a context of use, the composite image 305 and the viewer image may be displayed on the display 1131 of the terminal device 113 at the same time, so that the user may monitor current image content of the composite image 305 and viewing status of the viewer, and may instantly adjust the image content of the composite image 305 or share information with the viewer in real-time interaction.

In addition, according to some other embodiments of the disclosure, the cloud equipment 120 may also be implemented as a cloud service management platform, to provide such as recording, bypass live broadcasting, video on demand, content analysis, real-time communication (RTC) or edge node service (ENS) and other multimedia functions, or be configured to manage multiple video interactive platforms.

Figure 4:
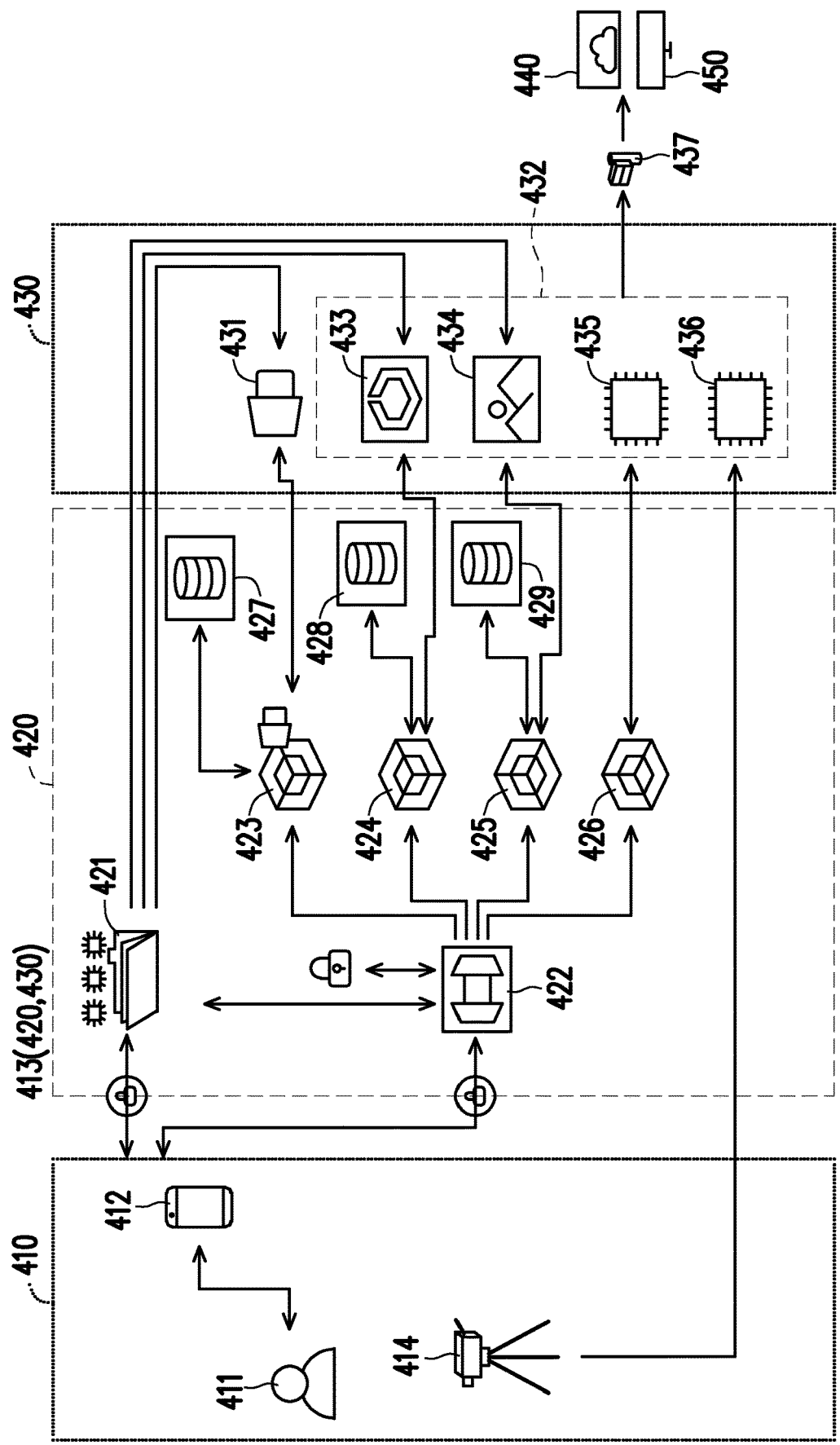
FIG. 4 is an image control structure diagram of a live broadcasting recording system according to an embodiment of the disclosure.

FIG. 4 is an image control structure diagram of a live broadcasting recording system according to an embodiment of the disclosure. FIG. 4 is used to illustrate program processing structure of the live broadcasting recording operations of the disclosure, and it may be implemented by, for example, software and hardware features according to the embodiment of FIG. 1. According to this embodiment, in a user portion 410, a user 411 may operate a terminal device 412, so that the terminal device 412 communicate with a processing host 413, and the processing host 413 may be controlled by the terminal device 412. In addition, a camera 414 may obtain a user image. The processing host 413 includes a processing core portion 420 and an application portion 430. The processing core portion 420 is, for example, a processor, a processing chip, or a circuit. The processing core portion 420 of the processing host 413 has a storage space 421. The storage space 421 may store data in databases 427 to 429 correspondingly connected to those who have qualification to log in the system (or perform direct or advanced storage on the cloud device). In the application portion 430, the processing host 413 may execute a presentation program 431, and each of an augmented reality program 433, a background execution program 434, a multi-layer combination program 435, and a background image removal program 436 independently or integrated into an image programming software (unity) 432.

Specifically, when the user 411 operates the terminal device 412, an application gateway 422 of the processing host 413 may recognize a login operation of the terminal device 412, and execute correspondingly a presentation service module 423, an augmented reality service module 424, a background execution service module 425, and a layer service module 426 according to the operation of the user 411 on the terminal device 412. The presentation service module 423, the augmented reality service module 424, and the background execution service module 425 may respectively access the databases 427 to 429 to obtain the presentation image, the augmented reality object image, and the three-dimensional virtual reality background image. The presentation service module 423, the augmented reality service module 424, and the layer service module 426 may input the presentation image, the augmented reality object image, and the three-dimensional virtual reality background image to the presentation program 431, the augmented reality program 433, and the background execution program 434 for execution and use. The background image removal program 436 may obtain the user image provided by the camera 414, and execute the background removal processing on the user image to generate the person image. According to this embodiment, the multi-layer combination program 435 may perform the multi-layer processing to fuse the person image, the three-dimensional virtual reality background image, the augmented reality object image, and the presentation image to generate the composite image according to an image stacking sequence preset by the layer service module 426. In addition, the multi-layer combination program 435 may output the composite image to a file compression program 437 for file encryption and file compression. The file compression program 437 may output an encrypted and compressed composite image to an external cloud device 440 or a viewer equipment 450. Alternatively, according to some embodiments of the disclosure, the file compression program 437 may also store the encrypted and compressed composite image to a portable hard drive or a computer hard drive.

In addition, according to some other embodiments of the disclosure, in the processing core portion 420 of the processing host 413, command line control and configuration, split screen switching and audio source access on viewer side, system configuration, system restart, composite image resolution configuration, video upload, video storage, automatic upload to the cloud equipment, reporting service operation status, service operation status, system operation logs, broadcast services, cloud synchronization and other operations and their corresponding modules may also be executed, and are not particularly limited in the disclosure.

According to this embodiment, the terminal device 412 may output a control signal to a processing device of the processing host 413 according to at least one of operation results of a presentation operation menu, an augmented reality operation menu, a background selection menu, and a system setting menu in a user interface displayed by the display. The processing device of the processing host 413 may execute the multi-layer processing according to the control signal. According to this embodiment, the user may execute the system setting menu by the user interface of the terminal device 412, and the user interface may display a stack layout selection page, a viewer screen page, or a network setting page. However, examples of the presentation operation menu, the augmented reality operation menu, the background selection menu, and the system setting menu will be illustrated by the following multiple embodiments.

Figure 5B:
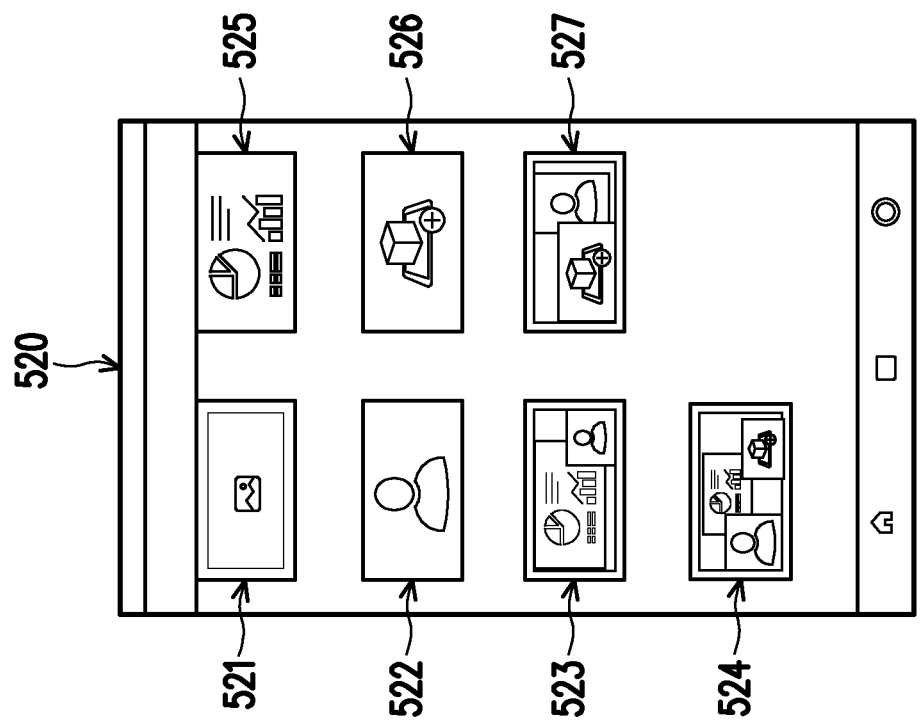
FIG. 5B is a schematic diagram of a stack layout selection page according to an embodiment of the disclosure.
Figure 5A:
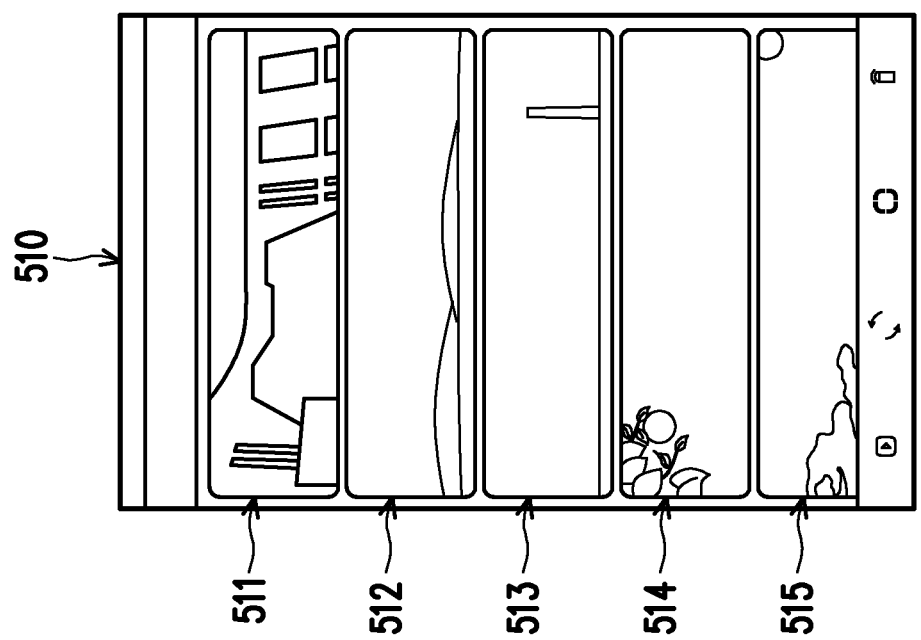
FIG. 5A is a schematic diagram of a background selection menu according to an embodiment of the disclosure.

With reference to FIG. 5A, FIG. 5A is a schematic diagram of a background selection menu according to an embodiment of the disclosure. In some contexts of operating of the disclosure, when the user executes the background selection menu of the background execution service module 425 in the processing core portion 420 of the processing host 413 by the user interface of the terminal device 412, the display of the terminal device 412 may display a background selection page 510 as shown in FIG. 5A or a background movement control page. The background selection page 510 may include multiple three-dimensional virtual reality background images 511 to 515. The user 411 may select (for example, touch and select) one of the three-dimensional virtual reality background images 511 to 515 by the terminal device 412, so that the background execution service module 425 obtains corresponding image data from the database 429, and provide the corresponding image data to the background execution program 434. In other words, the processing device of the processing host 413 may adjust the three-dimensional virtual reality background image in the composite image according to the control signal corresponding to the background movement control page or the background selection page 510.

With reference to FIG. 5B, FIG. 5B is a schematic diagram of a stack layout selection page according to an embodiment of the disclosure. In some contexts of operating of the disclosure, when the user executes the layer service module 426 by the terminal device 412, the display of the terminal device 412 may display a stack layout selection page 520 as shown in FIG. 5B. The stack layout selection page 520 may include multiple layout patterns 521 to 527. The layout pattern 521 may, for example, display the three-dimensional virtual reality background image separately. The layout pattern 522 may, for example, display the person image separately. The layout pattern 523 may be, for example, a stacked display of the person image and the presentation image, and the person image is overlaid on the presentation image. The layout pattern 524 may be, for example, a stacked display of the person image, the presentation image, and the augmented reality object image, and the person image and the augmented reality object image are overlaid on the presentation image. The layout pattern 525 may, for example, display the presentation image separately. The layout pattern 526 may, for example, display the augmented reality object image separately. The layout pattern 527 may be, for example, a stacked display of the augmented reality object image and the person image, and the augmented reality object image is overlaid on the person image. The user 411 may select one of the layout patterns 521 to 527 by the terminal device 412, so as to dynamically adjust size of each image or each object in the composite image or the display result of relative position configuration.

Figure 5C:
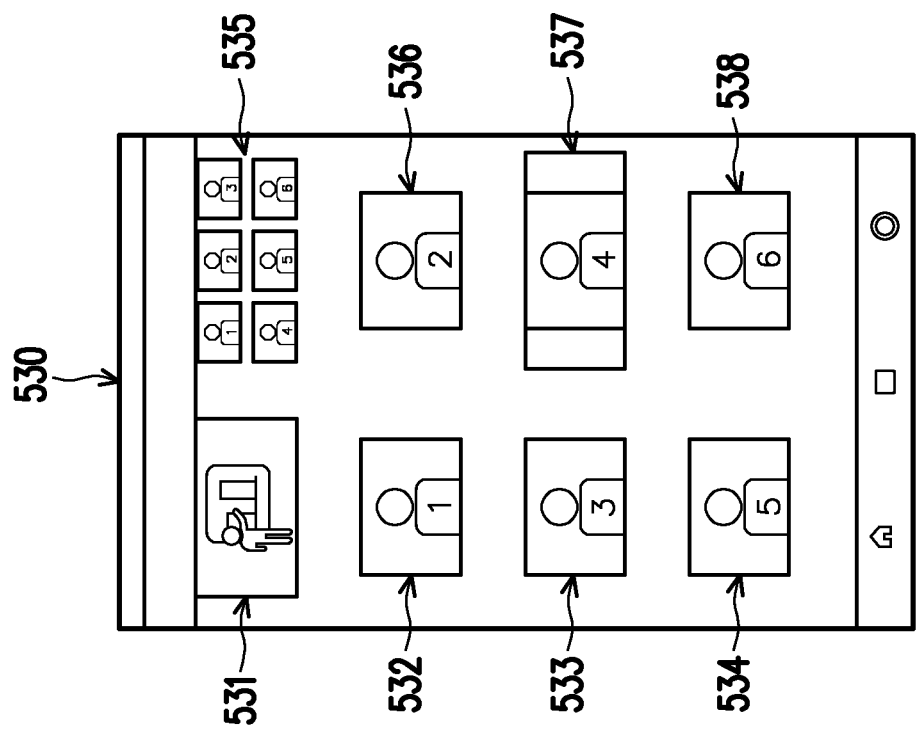
FIG. 5C is a schematic diagram of a viewer screen page according to an embodiment of the disclosure.

With reference to FIG. 5C, FIG. 5C is a schematic diagram of a viewer screen page according to an embodiment of the disclosure. In some contexts of operating of the disclosure, the processing host 413 may be connected to multiple viewer terminals for video conference, for example. The processing host 413 may obtain multiple viewer images from multiple viewer terminals. Therefore, the display of the terminal device 412 may display a viewer screen page 530 as shown in FIG. 5C. The viewer screen page 530 may include multiple screen patterns 531 to 538. The screen pattern 531 may display the composite image. The screen patterns 532 to 534 and 536 to 538 may display different viewer screens. The screen pattern 535 may display all the viewer screens. The user 411 may select one of the screen patterns 531 to 538 by the terminal device 412, so as to determine the display result of the display of the terminal device 412.

In addition, in some contexts of operating of the disclosure, the user may execute network settings by the terminal device 412. The display of the terminal device 412 may display the network setting page to allow the user to operate the terminal device 412 for communication settings, or set up a communication connection with the processing host 413.

Figure 6B:
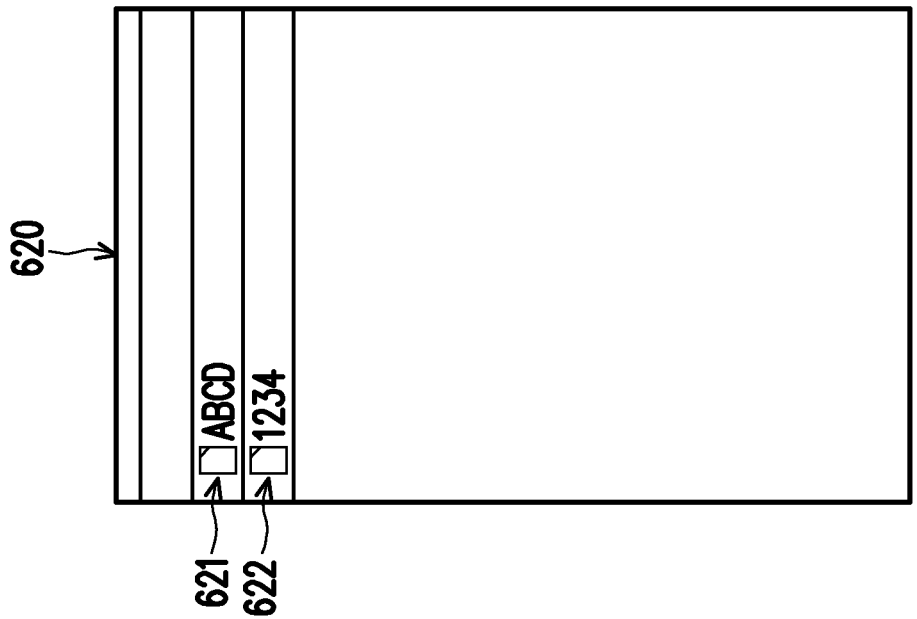
FIG. 6B is a schematic diagram of a presentation selection menu according to an embodiment of the disclosure.
Figure 6A:
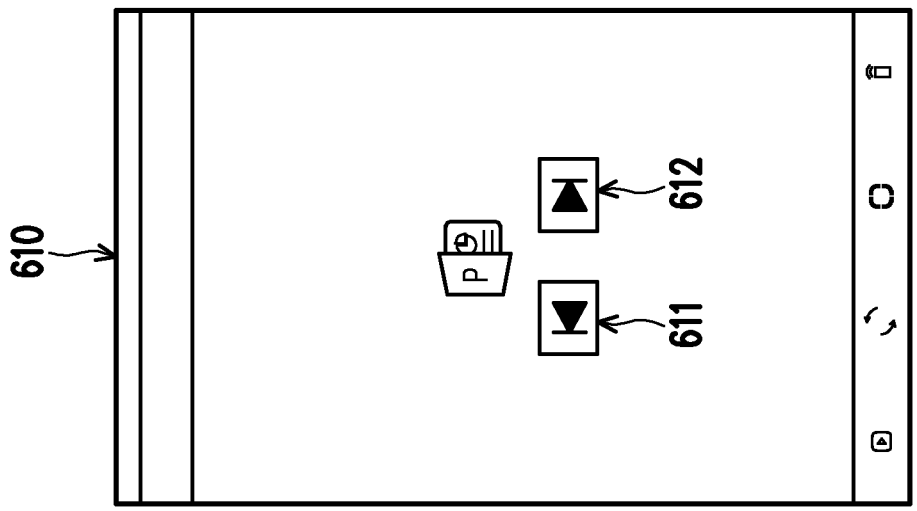
FIG. 6A is a schematic diagram of a presentation operation menu according to an embodiment of the disclosure.

With reference to FIG. 6A, FIG. 6A is a schematic diagram of a presentation operation menu according to an embodiment of the disclosure. In some contexts of operating of the disclosure, when the user executes the presentation operation menu by the user interface of the terminal device 412, the display of the terminal device 412 may display a user interface of a presentation page flip control page 610 as shown in FIG. 6A. The presentation page flip control page 610 includes a selection icon 611 and a selection icon 612. The user 411 may operate the selection icon 611 or the selection icon 612 by the terminal device 412 to, for example, perform a page flip operation of the presentation image. With reference to FIG. 6B, FIG. 6B is a schematic diagram of a presentation selection menu according to an embodiment of the disclosure. In some contexts of operating of the disclosure, when the user executes the presentation operation menu by the user interface of the terminal device 412, the display of the terminal device 412 may display a user interface of a presentation selection page 620 as shown in FIG. 6B. The presentation selection page 620 includes a file icon 621 and a file icon 622. The user 411 may operate the file icon 621 or the file icon 622 by the terminal device 412 to open the presentation image corresponding to the file icon 621 or the file icon 622. In other words, the processing device of the processing host 413 may adjust the presentation image in the composite image according to the control signal corresponding to the presentation page flip control page 610 or the presentation selection page 620.

Figure 6D:
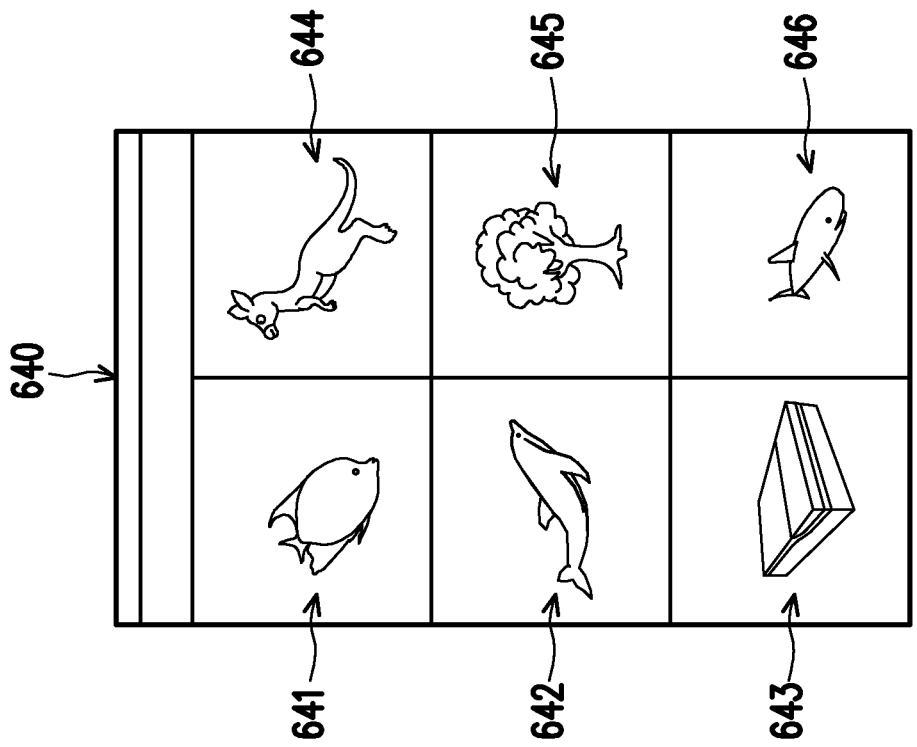
FIG. 6D is a schematic diagram of an augmented reality selection menu according to an embodiment of the disclosure.
Figure 6C:
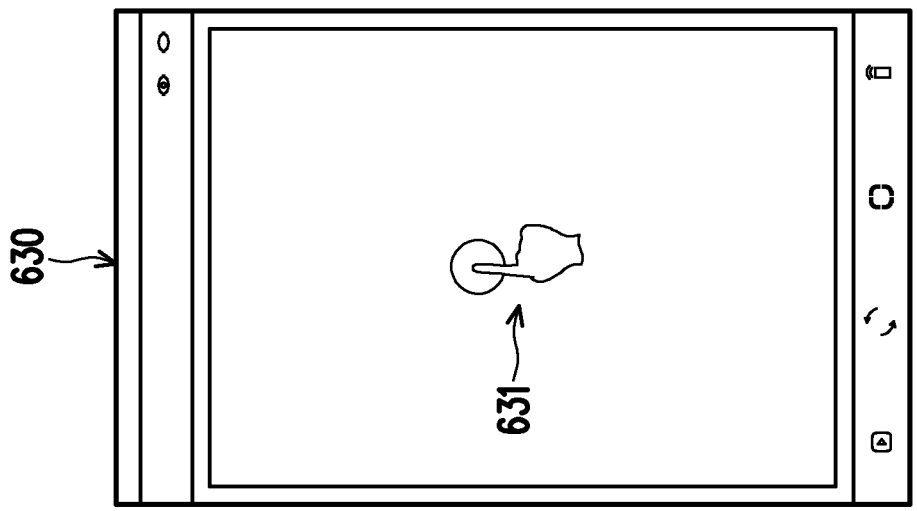
FIG. 6C is a schematic diagram of an augmented reality operation menu according to an embodiment of the disclosure.

With reference to FIG. 6C, FIG. 6C is a schematic diagram of an augmented reality operation menu according to an embodiment of the disclosure. In some contexts of operating of the disclosure, when the user executes the augmented reality operation menu by the user interface of the terminal device 412, the display of the terminal device 412 may display an object rotation control page 630 as shown in FIG. 6C. The object rotation control page 630 includes a rotation icon 631. The user 411 may operate the rotation icon 631 by the terminal device 412 to rotate the position of the corresponding augmented reality object image in the composite image. With reference to FIG. 6D, FIG. 6D is a schematic diagram of an augmented reality selection menu according to an embodiment of the disclosure. In some contexts of operating of the disclosure, when the user executes the augmented reality operation menu by the user interface of the terminal device 412, the display of the terminal device 412 may display a user interface of an object selection page 640 as shown in FIG. 6D. The object selection page 640 includes multiple augmented reality object images 641 to 646. The user 411 may select one of the augmented reality object images 641 to 646 by the terminal device 412, so that the augmented reality service module 424 obtains corresponding image data from the database 428 and provides the corresponding image data to the augmented reality program 433. In other words, the processing device of the processing host 413 may adjust the augmented reality object image in the composite image according to the control signal corresponding to the object rotation control page 630 or the object selection page 640.

In summary, the live broadcasting recording equipment, the live broadcasting recording system, and the live broadcasting recording method of the disclosure may instantly utilize at least one of the person image, the three-dimensional virtual reality background image, the augmented reality object image, the presentation image, and video image to generate the composite image, and the composite image may be instantly provided to the viewer equipment for display or storage to the cloud equipment, personal hard drive or computer hard drive, etc. The live broadcasting recording equipment, the live broadcasting recording system, and the live broadcasting recording method of the disclosure may provide a portable terminal equipment for the user to operate, so that the user may easily adjust the content of the composite image. The live broadcasting recording equipment, the live broadcasting recording system, and the live broadcasting recording method may display the viewer image in real time by the display of the terminal equipment to achieve video interaction.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A live broadcasting recording equipment comprising a first camera, a processing device, and a terminal device and the live broadcasting recording equipment configured to communicate with a viewer equipment, wherein
the first camera is configured to capture images to provide photographic data;
the processing device is coupled to the first camera and is configured to execute background removal processing on the photographic data to generate a person image; and
the terminal device is configured to communicate with the processing device and has a display,
wherein the processing device is configured to execute multi-layer processing to fuse the person image, a background image, and at least one of an augmented reality object image and a presentation image, so as to generate a composite image, the processing device is configured to receive a viewer image captured by a second camera associated with the viewer equipment, the viewer image is different from the person image, wherein the processing device is configured to provide the composite image and the viewer image to the display of the terminal device, and wherein a user interface is configured to be displayed by the display of the terminal device, the user interface is configured to selectively display a background selection page for selecting the background image, a stack layout selection page, a viewer screen page for viewing the viewer image, a presentation page flip control page, and a presentation selection page for selecting the presentation image, wherein when the stack layout selection page is configured to provide at least one predetermined stacking sequence formed by the person image, the background image, and the at least one of the augmented reality object image and the presentation image, the terminal device is configured to provide a control signal to the processing device in accordance with a selection of the at least one predetermined stacking sequence, and the processing device is configured to adjust content of the composite image according to the control signal.

2. The live broadcasting recording equipment according to claim 1, wherein when the user interface is configured to execute a presentation operation menu, the user interface is configured to display the presentation page flip control page or the presentation selection page, and the processing device is configured to adjust the presentation image in the composite image according to a control signal corresponding to an operation of the presentation page flip control page or an operation of the presentation selection page.

3. The live broadcasting recording equipment according to claim 1, wherein when the user interface is configured to execute an augmented reality operation menu, the user interface is configured to display an object rotation control page or an object selection page, and when the object rotation control page or the object selection page is selected, the processing device is configured to adjust the augmented reality object image in the composite image according to a control signal corresponding to an operation of the object rotation control page or an operation of the object selection page.

4. The live broadcasting recording equipment according to claim 1, wherein when the user interface is configured to execute a background selection menu, the user interface is configured to display a background movement control page or a background selection page, and when the background movement control page is selected, the processing device is configured to adjust the background image in the composite image according to a control signal corresponding to an operation of the background movement control page.

5. The live broadcasting recording equipment according to claim 1, wherein when the user interface is configured to execute a system setting menu, the user interface is configured to display a network setting page.

6. The live broadcasting recording equipment according to claim 1, wherein the processing device is configured to provide the composite image to the viewer equipment for display.

7. The live broadcasting recording equipment according to claim 1, wherein the processing device is configured to fuse a video image into the composite image.

8. A live broadcasting recording system comprising a live broadcasting recording equipment and a viewer equipment, wherein the live broadcasting recording equipment comprises a first camera, a processing device, and a terminal device, wherein the first camera is configured to capture images to provide photographic data;

the processing device is coupled to the first camera and is configured to execute background removal processing on the photographic data to generate a person image; and the terminal device is configured to communicate with the processing device and has a display; and the viewer equipment is configured to communicate with the live broadcasting recording equipment, wherein the processing device is configured to execute multi-layer processing to fuse the person image, a background image, and at least one of an augmented reality object image and a presentation image, so as to generate a composite image, and the processing device is configured to receive a viewer image captured by a second camera associated with the viewer equipment, the viewer image is different from the person image, wherein the processing device is configured to provide the composite image and the viewer image to the display of the terminal device, and wherein a user interface is displayed by the display of the terminal device, the user interface is configured to selectively display a background selection page for selecting the background image, a stack layout selection page, and a viewer screen page for viewing the viewer image, a presentation page flip control page and a presentation selection page for selecting the presentation image, wherein when the stack layout selection page is configured to provide at least one predetermined stacking sequence formed by the person image, the background image, and the at least one of the augmented reality object image and the presentation image, the terminal device is configured to provide a control signal to the processing device in accordance with a selection of the at least one predetermined stacking sequence, and the processing device is configured to adjust content of the composite image according to the control signal.

9. The live broadcasting recording system according to claim 8, wherein when the user interface is configured to execute a presentation operation menu, the user interface is configured to display the presentation page flip control page or the presentation selection page, and the processing device is configured to adjust the presentation image in the composite image according to a control signal corresponding to an operation of the presentation page flip control page or an operation of the presentation selection page.

10. The live broadcasting recording system according to claim 8, wherein when the user interface is configured to execute an augmented reality operation menu, the user interface is configured to display an object rotation control page or an object selection page, and when the object rotation control page or the object selection page is selected, the processing device is configured to adjust the augmented reality object image in the composite image according to a control signal corresponding to an operation of the object rotation control page or an operation of the object selection page.

11. The live broadcasting recording system according to claim 8, wherein when the user interface is configured to execute a background selection menu, the user interface is configured to display a background movement control page or a background selection page, and when the background movement control page is selected, the processing device is configured to adjust the background image in the composite image according to a control signal corresponding to an operation of the background movement control page.

12. The live broadcasting recording system according to claim 8, wherein when the user interface is configured to execute a system setting menu, the user interface is configured to display a network setting page.

13. The live broadcasting recording system according to claim 8, wherein the processing device is configured to provide the composite image to the viewer equipment for display.

14. The live broadcasting recording system according to claim 9, wherein the processing device is configured to fuse a video image into the composite image.

15. A live broadcasting recording method, applied to a live broadcasting recording system comprising a live broadcasting recording equipment and a viewer equipment, the live broadcasting recording equipment comprising a first camera, a processing device, and a terminal device with a display, the viewer equipment communicating with the live broadcasting recording equipment, comprising:
    providing photographic data by the first camera of the live broadcasting recording equipment through capturing;
    generating a person image by the processing device of the live broadcasting recording equipment through executing background removal processing on the photographic data;
    executing multi-layer processing by the processing device to fuse the person image, a background image, at least one of an augmented reality object image and a presentation image, so as to generate a composite image;
    communicating with the viewer equipment by the processing device;
    receiving, by the processing device, a viewer image captured by a second camera associated with the viewer equipment, wherein the viewer image is different from the person image;
    communicating with the processing device by the terminal device;
    providing the composite image and the viewer image to the display of the terminal device by the processing device;
    displaying a user interface by the display of the terminal device, wherein the user interface is configured to selectively display a background selection page for selecting the background image, a stack layout selection page, and a viewer screen page for viewing the viewer image, a presentation page flip control page and a presentation selection page for selecting the presentation image;
    providing at least one predetermined stacking sequence formed by the person image, the background image, and the at least one of the augmented reality object image and the presentation image by the stack layout selection page;
    providing a control signal to the processing device in accordance with a selection of the at least one predetermined stacking sequence; and
    adjusting content of the composite image according to the control signal by the processing device.

16. The live broadcasting recording method according to claim 15, wherein the multi-layer processing comprises:
    displaying an object rotation control page or an object selection page by the user interface when the user interface is configured to execute an augmented reality operation menu; and
    adjusting the augmented reality object image in the composite image by the processing device according to a control signal corresponding to an operation of the object rotation control page or an operation of the object selection page.

17. The live broadcasting recording method according to claim 15, wherein the multi-layer processing comprises:
    displaying a background movement control page or a background selection page by the user interface when the user interface is configured to execute a background selection menu; and
    adjusting the three-dimensional virtual reality background image in the composite image by the processing device according to a control signal corresponding to an operation of the background movement control page.

18. The live broadcasting recording method according to claim 15, wherein the multi-layer processing comprises:
    displaying a network setting page by the user interface when the user interface is configured to execute a system setting menu.

19. The live broadcasting recording method according to claim 15 further comprising:
    providing the composite image to the viewer equipment by the processing device for display.

20. The live broadcasting recording method according to claim 15, wherein the multi-layer processing further comprises:
    fusing a video image into the composite image by the processing device.

21. The live broadcasting recording method according to claim 15, wherein the composite image comprises the person image, the background image, the augmented reality object image and the presentation image.

22. The live broadcasting recording equipment according to claim 1, wherein the composite image comprises the person image, the background image, the augmented reality object image and the presentation image.

23. The live broadcasting recording equipment according to claim 7, wherein the composite image comprises the person image, the background image, the augmented reality object image and the presentation image.

* * * * *